July 8, 1947.  E. C. MAGDEBURGER  2,423,602

MANIFOLD FOR INTERNAL-COMBUSTION ENGINES

Filed Oct. 13, 1942  3 Sheets-Sheet 1

Inventor
Edward C. Magdeburger

By Dodge and Ins

Attorneys

July 8, 1947.  E. C. MAGDEBURGER  2,423,602
MANIFOLD FOR INTERNAL-COMBUSTION ENGINES
Filed Oct. 13, 1942  3 Sheets-Sheet 2
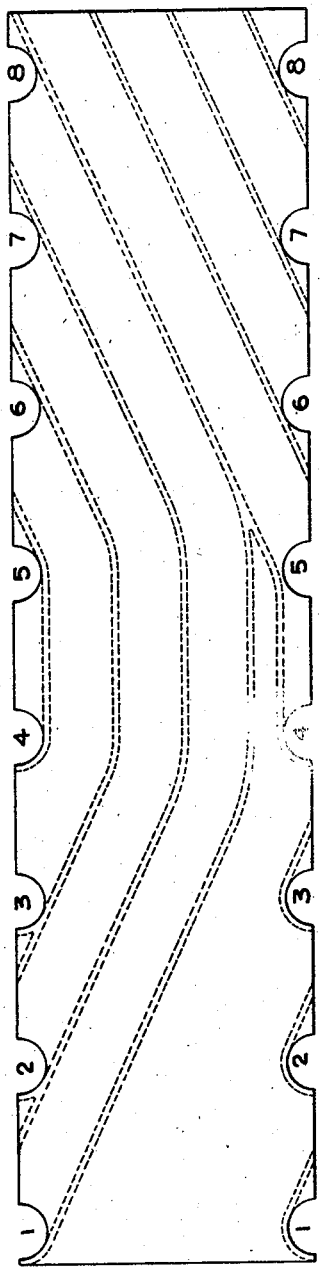
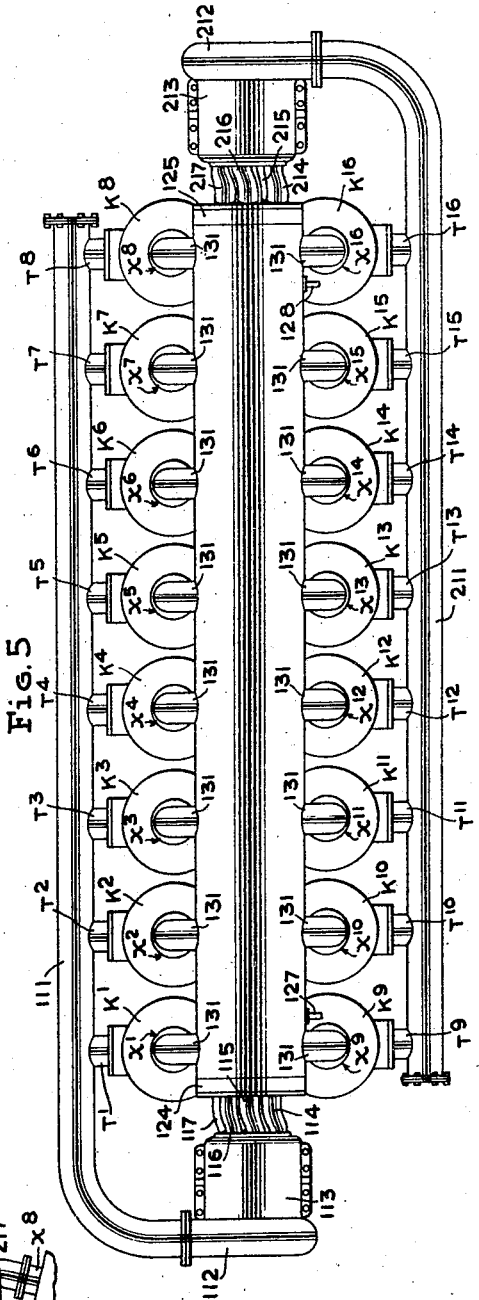
Inventor
Edward C. Magdeburger
Attorneys July 8, 1947.  E. C. MAGDEBURGER  2,423,602
MANIFOLD FOR INTERNAL-COMBUSTION ENGINES
Filed Oct. 13, 1942  3 Sheets-Sheet 3

Inventor
Edward C. Magdeburger
By Dodge and Ims
Attorneys

Patented July 8, 1947

2,423,602

UNITED STATES PATENT OFFICE 2,423,602

MANIFOLD FOR INTERNAL-COMBUSTION ENGINES

Edward C. Magdeburger, Washington, D. C.

Application October 13, 1942, Serial No. 461,878

13 Claims. (Cl. 60—13)

1

This invention relates to internal combustion engines, and particularly to manifolds. The principle is particularly adapted for use with exhaust manifolds but is not necessarily limited thereto.

Where a large number of cylinders exhaust into a single manifold there are cross flows which exercise an adverse effect on exhaust. This is particularly true where air scavenging is provided as is the case for example with many types of Diesel engine, both two cycle and four cycle.

In recognition of this fact, it is common practice in applying superchargers (for example, turbo-chargers) to four cycle Diesel engines to use separate exhaust pipes. Each such pipe serves not over three cylinders whose exhaust periods do not materially overlap, and preferably do not overlap at all. With turbine driven superchargers each exhaust pipe feeds a separate turbine nozzle. In the preferred embodiment of the invention, two cylinders exhaust into a single exhaust pipe and thus cross flows are inhibited.

Since the heat energy of the exhaust is usefully applied in the supercharger, the exhaust pipes should be insulated. An enclosing water jacket is desirable to intercept stray heat passing the insulation and the provision of one is a feature of the invention.

The invention contemplates the use of a compact multi-passaged exhaust manifold, enclosed in heat insulation. This reduces to a minimum the area through which heat loss can occur. Preferably the insulation is itself enclosed by a water jacket, which intercepts only stray heat passing through the insulation. This prevents overheating of the engine room, and involves no avoidable waste of heat.

The most troublesome problem in developing a multipassage manifold is the provision of connections from the cylinder to each passage. According to the preferred embodiment of the invention, helicoid partitions in a cylindrical manifold produce helical passages whose pitch is a function of cylinder spacing so that each successive cylinder in a row exhausts into a different passage through connections which are alined and thus uniformly located. They can be made substantially identical.

An elaboraton of this concept involves reversal of the helical pitch at mid length of the row of cylinders, and the connection of two cylinders to a single passage, the two cylinders being connected to portions of opposite helical pitch. In this way the most favorable firing order is secured and the exhaust periods of cylinders connected to a single passage are widely spaced. In

2 four cycle engines the exhaust periods of the two connected cylinders start at intervals of 360° of crank angle.

The scheme is useful for exhaust manifolds without any supercharger, but even more useful where a supercharger is used. So far as uniformity of connection is concerned, the helical arrangement is useful for any divided manifold applied to an engine in which the cylinders are in line.

Reference to cylinders in line is not intended to exclude engines having more than one bank of alined cylinders. In such engines a subdivided manifold can be used for each bank. Where there are two closely adjacent banks, as for example, there are in a V-type engine, a single helically divided manifold with two rows of alined connections may be used to serve both banks.

Preferred embodiments will now be described by reference to the accompanying drawing, in which:

Fig. 4 is a diagrammatic development of the inner manifold shell, the traces of the helical core partitions being indicated in dotted lines.

Fig. 5 is a plan view indicating how the invention can be applied as a single subdivided manifold to two groups of eight cylinders in line. Two turbo chargers are indicated, each serving a corresponding line of cylinders.

Fig. 6 is a fragmentary end view of the engine of Fig. 5.

Figure 7:
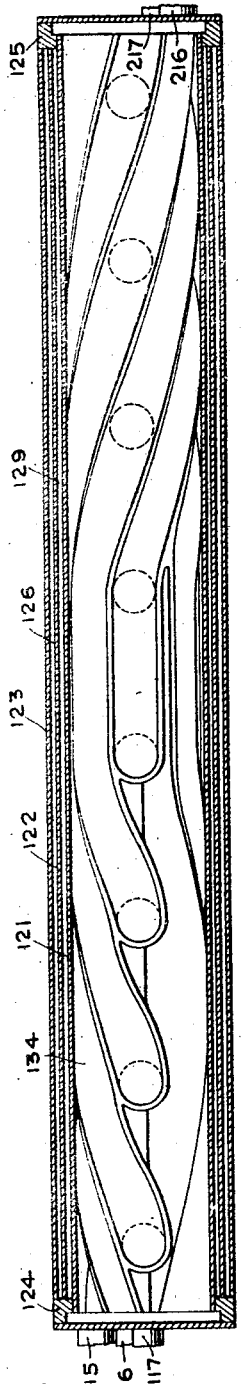
Figs. 7 and 8 are views of the manifold shown in Figs. 5 and 6, vertically sectioned similarly to Fig. 2 and looking from opposite sides of the engine. Thus the right hand end in Fig. 7 is the left hand end in Fig. 8.
Figure 8:
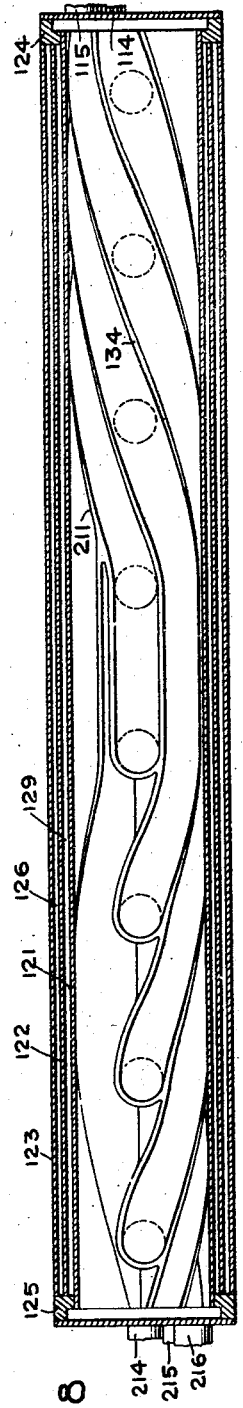
Figure 9:
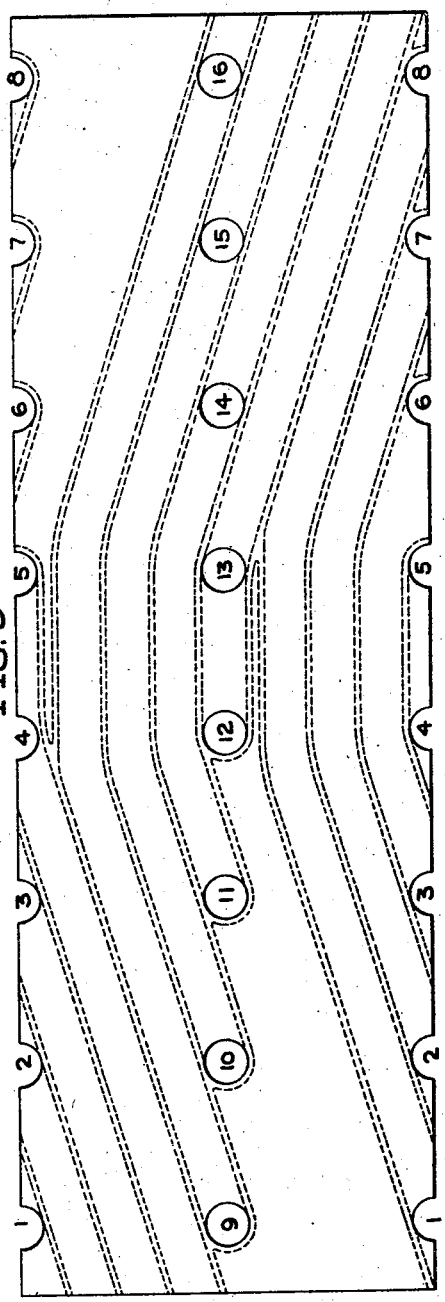
Fig. 9 is a view similar to Fig. 4 but diagramming the manifold of Figs. 5 to 8.

Note.—Although Figs. 7 and 8 at first glance may seem to indicate opposite helical pitches in the same end of the manifold, this is not the fact. The right hand end of Fig. 7 and the left hand end of Fig. 8 represent the same end of the manifold, and show the core with R. H. helical pitch. The other end has L. H. pitch.

Figure 1:
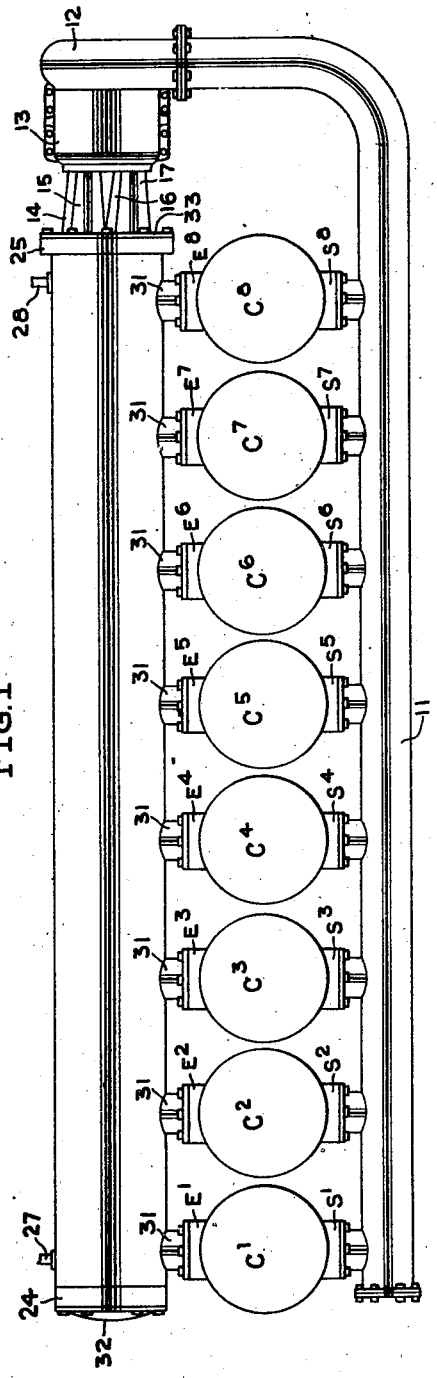
Fig. 1 is a plan view indicating how the invention can be applied to a vertical engine having eight cylinders in line. The use of a turbo charger is indicated.

In Fig. 1 the cylinders are represented by the reference characters $C^1$ to $C^8$, both inclusive. The exhaust connections of the cylinders are correspondingly represented by the reference characters $E^1$ to $E^8$, and the scavenging air connections are indicated by the reference characters $S^1$ to $S^3$.

The engine is assumed to be of the four cycle type, but no attempt has been made to illustrate the exhaust valves or the air inlet (scavenging) valves. The valve mechanism will accord with standard practice and is not a feature of the invention. A suitable firing order is $C^1$, $C^6$, $C^2$, $C^4$, $C^8$, $C^3$, $C^7$, $C^5$, but other orders are possible as will later appear.

The intake air manifold is indicated at 11 and is supplied with air by the blower unit 12 of a supercharger of the turbo charger type, whose turbine driving unit is indicated at 13. There are four connections 14, 15, 16 and 17, which supply exhaust gases derived from corresponding passages in the exhaust manifold to the four nozzles in the turbine unit 13. The arrangement so far described conforms to known practice in turbo charging engines. While a turbo charger type of supercharger is preferred, any supercharger might be used with the improved exhaust manifold, provided that supercharger is not so arranged as to afford undesirable cross connection between the separate passages in the manifold. The improved manifold may be used to advantage without any supercharger, since it is effective to prevent cross flows of exhaust gases.

The manifold comprises an inner shell 21, an intermediate shell 22 and an outer shell 23. The intermediate and outer shells 22 and 23 are rigidly connected to the end rings 24 and 25, and define a jacket space 26 through which water is circulated. The inlet and discharge connections for water are indicated at 27 and 28. The inner shell 21 makes a sliding fit with the ring 24, the purpose being to permit differential expansion of this relatively hot internal shell with reference to the two outer shells.

The space 29 between the inner shell 21 and the intermediate shell 22 is a dead gas space, the dead gas serving as heat insulation. Obviously, this space might be filled with any suitable insulating material other than the inert gas.

Figure 3:
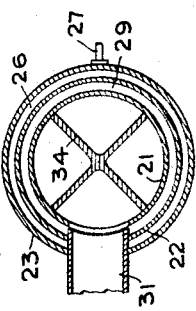
Fig. 3 is a section on the line 3—3 of Fig. 2.

Communicating with respective exhaust connections $E^1$ to $E^8$, inclusive, are the branches 31 each of which passes through and makes tight joints with the intermediate 22 and the outer shell 23. The end of each branch 31 makes a reasonably tight connection with the margins of an aligned opening in the inner shell 21, as is best shown in Fig. 3. Because of possible differential expansion it is not considered expedient to connect the branches 31 to the inner shell 21, but the closest practicable approach to a tight joint is secured.

The end of the manifold remote from the turbo charger is closed by cap 32 is bolted to the ring 24. The other end is closed by plates 33, from which the turbine inlet connections 14 to 17, inclusive, extend. These connections communicate with corresponding passages in the manifold.

The passages in question are produced by helical vanes 34 which make up the so-called core of the manifold. Assuming an eight cylinder engine, there would be four radial vanes, each having a helical pitch, the helical vanes defining four intervening helical passages. If the engine had only six cylinders, there would be three such passages, as if the engine had ten cylinders, there would be five, assuming always that the preferred arrangement is used in which exhausts connected to a single passage are timed 360° apart.

While the invention is particularly applicable to engines having an even number of cylinders, it can be applied to engines having an odd number of cylinders. Assume a prime number such as 7 cylinders. There would be four passages, three of which serve two cylinders each and the fourth which serves the remaining cylinder. With nine cylinders it is practicable to use three passages, each receiving exhaust from three cylinders, but this is considered undesirable. Five passages, four of which serve two cylinders each, is a better arrangement.

Figure 2:
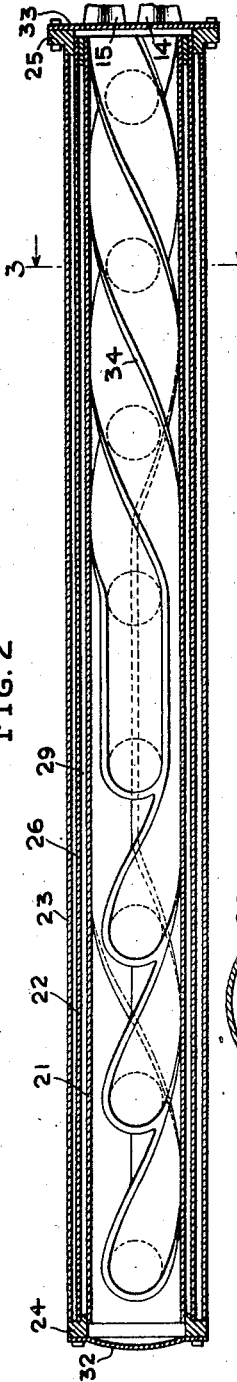
Fig. 2 is a vertical axial section through the shell structure of the manifold shown in Fig. 1, the passage-defining core being shown in elevation.

The pitch of the helical vanes is, in the engine illustrated, one quarter turn for each cylinder interval, and the pitch reverses at mid length of the engine. The purpose of reversal of pitch is to permit adoption of the most desirable firing order in four cycle engines. As shown in Figs. 2 and 4, this results in a divider structure parts of which have differing helical conformations and a part of which is not helical but is straight. The reversal of pitch is not ordinarily used with two cycle engines.

It follows from the construction described that each of the four exhaust paths in the manifold serves two cylinders whose exhaust periods never overlap, the two cylinders being in opposite halves of the cylinder row. Thus one path serves cylinders $C^1$ and $C^8$, another $C^2$ and $C^7$, the third $C^3$ and $C^6$, and the fourth $C^4$ and $C^5$.

It is usually advisable to take the exhaust off the end of the manifold as shown. It could, however, be taken off at mid length without change of principle. The advantage of the helical arrangement is that it permits all of the branch connections 31 to be identical and identically located on successive cylinders.

The development shown in Fig. 4 will make clear the arrangement of the flow paths in the manifold.

In dealing with engines having multiple banks of aligned cylinders such, for example, as V type engines, it is possible to use two manifolds constructed as shown in Figs. 1 to 4, one for each bank. Sometimes, however, it is desirable to use a single manifold, and the invention permits this, as is indicated in Figs. 5 to 9, inclusive.

In Fig. 5, there are two banks of cylinders indicated at $K^1$ to $K^8$, inclusive, and at $K^9$ to $K^{16}$, inclusive. The exhaust connections, shown as located on the cylinder heads, are indicated at $X^1$ to $X^{16}$, inclusive. The inlet or scavenging air connections are indicated at $T^1$ to $T^{16}$, inclusive. Construction of the manifold is essentially the same except that the core produces eight instead of four passages.

There is an internal shell 121, an intermediate shell 122, and an external shell 123, head rings 124 and 125, water jacket space 126, water connections 127 and 128, and insulating space 129. The inner shell 121 may have a sliding fit with either of the rings 124 or 125, and be fixed to the other. The branch exhaust connections 131 are L shaped, and suitably formed to connect with the exhausts connections $X^1$ to $X^{16}$, inclusive.

There are two superchargers, one mounted at each end of the manifold, the parts of the superchargers being identified by numbers related to those used in Fig. 1, the supercharger at one end having such numbers increased by 100 and the supercharger at the other end having numbers increased by 200. The inlet manifold for one bank of cylinders is fed by one of these two superchargers and is indicated by the number 111. That for the other bank is served by the other supercharger and is indicated at 211.

Figs. 7 and 8 make it clear that the vanes 134 of the core structure provide two groups of four passages each, the passages of each group being adjacent to each other and not intercalated between passages of the other group. Passages of the two groups lead, respectively, to opposite ends of the manifold. Thus, as best indicated in Fig. 6, there are four adjacent outlet connections 114 to 117 at one end, and four adjacent similar connections 214 to 217 at the other end.

The firing orders in the two groups of cylinders can be that already described, or any other order which will prevent the exhausts from overlapping as to any given passage. The reversal of the helical pitch is used in the sixteen cylinder arrangement to secure desirable four cycle firing order. In the double bank arrangement, as in the single bank arrangement, all the exhaust connections to the manifold are identical and all are identically located as to connection with the cylinder. As in the case of the structure shown in Figs. 1–4, and as is clearly shown in Figs. 7 to 9 the divider structure has parts of differing helical conformation and a part which is straight and not helical.

The invention affords a subdivided manifold characterized by the identical connections just mentioned, and characterized by the fact that the exhaust paths are simple, are not subject to sudden changes of direction, and impose no undesirable limitations on the firing order.

The invention contemplates the application of helical exhaust passages to an engine having a plurality of cylinders in line, and the use of the reverse helical arrangement to make possible the desired firing order in four cycle engines of the type just mentioned. It is susceptible of application in various ways, two of which have been described in considerable detail, and others which will readily suggest themselves to a person skilled in the art in light of the disclosure above made.

What is claimed is:

1. The combination of an internal combustion engine having an even number of cylinders, not less than six, arranged in line; a manifold divided by helicoid partitions into helical passages half as numerous as the cylinders and of a pitch which is a function of the cylinder spacing and reverses in direction at mid-length of the manifold; and substantially identically located connections between respective cylinders and helical passages, each passage being connected with two cylinders, the connections being with portions of opposite helical pitch.

2. The combination of an internal combustion engine having a plurality of cylinders arranged in line; an exhaust manifold serving said cylinders and subdivided into distinct exhaust passages, each for not to exceed two cylinders, by helicoid partitioning means which reverse their pitch at mid-length of the line of cylinders, the passages, when two cylinders are connected to a single passage, being connected to two cylinders which are respectively on opposite sides of such pitch reversal and whose exhausts alternate; and alined connections from respective cylinders to the manifold, which are similar in form, and in location on the cylinders.

3. The combination of an internal combustion engine having a plurality of cylinders arranged in line; an exhaust manifold serving said cylinders and subdivided into distinct exhaust passages, each for not to exceed two cylinders, by helicoid partitioning means which reverse their pitch at mid-length of the line of cylinders, the passages, when two cylinders are connected to a single passage, being connected to two cylinders which are respectively on opposite sides of such pitch reversal and whose exhausts alternate; alined connections from respective cylinders to the manifold, which are similar in form, and in location on the cylinders; heat insulating means enclosing said manifold; and a cooling jacket enclosing said insulating means.

4. The combination of an internal combustion engine having a plurality of cylinders arranged in line; an exhaust manifold divided into helical passages half as numerous as the cylinders and of a pitch which is a function of the cylinder spacing and reverses in direction at mid-length of the manifold; and substantially identically located connections from respective cylinders to the helical passages, each passage being connected to two cylinders, the two connections to each passage being with portions of opposite pitch, and the firing order of the engine being such that each passage receives exhaust from only one cylinder at a time.

5. The combination of a multiple cylinder internal combustion engine having cylinders in line; and an exhaust manifold subdivided into distinct exhaust passages having successive straight and helicoid portions, there being one exhaust passage for each two cylinders, each passage being connected to two cylinders whose exhausts alternate, and the connections from all cylinders to the manifold passages being similar in form and in location on the cylinders.

6. The combination of an internal combustion engine having two banks of cylinders, the cylinders in each bank being arranged in line; a manifold subdivided into a plurality of helical passages whose pitch is a function of the cylinder spacing in the banks of cylinders; and connections from each passage to corresponding cylinders, said connections being alined in rows, one row for each bank of cylinders and substantially identically located on the cylinders of each bank.

7. The combination of an internal combustion engine having two banks of cylinders, the cylinders in each bank being arranged in line; an exhaust manifold subdivided into a plurality of helical passages whose pitch is a function of the cylinder spacing in the banks of cylinders; connections from each passage to corresponding cylinders, said connections being alined in rows, one row for each bank of cylinders and substantially identically located on the cylinders of each bank; and two turbo-chargers, one mounted at each end of the manifold and each connected to supply air to the engine, said turbo-chargers having multiple jet turbines, respective jets of which are connected to be fed with exhaust gas by corresponding manifold passages.

8. The combination of an internal combustion engine having two banks of cylinders, each bank comprising a plurality of cylinders arranged in line; an exhaust manifold divided into helical passages half as numerous as the cylinders in the entire engine, the helical pitch being a function of the spacing of alined cylinders and reversing in direction at mid-length of the manifold; and two rows of alined connections respectively between cylinders of the two banks and the manifold, pairs of connections being between two cylinders in the same bank and the same passage but in portions thereof having opposite helical pitches.

9. The combination of an internal combustion engine having two banks of cylinders, each bank comprising a plurality of cylinders arranged in line; an exhaust manifold divided into helical passages half as numerous as the cylinders in the entire engine, the helical pitch being a function of the spacing of alined cylinders and reversing in direction at mid-length of the manifold; two rows of alined connections respectively between cylinders of the two banks and the manifold, pairs of connections being between two cylinders in the same bank and the same passage but in portions thereof having opposite helical pitches; and two turbo-chargers connected to supply air to the engine, said turbo-chargers having multiple jet turbines, respective jets of which are supplied by corresponding manifold passages.

10. The combination of an internal combustion engine having two banks of cylinders, each bank comprising a plurality of cylinders arranged in line; an exhaust manifold divided into helical passages half as numerous as the cylinders in the entire engine, the helical pitch being a function of the spacing of alined cylinders and reversing in direction at mid-length of the manifold; two rows of alined connections respectively between cylinders of the two banks and the manifold, pairs of connections being between two cylinders in the same bank and the same passage but in portions thereof having opposite helical pitches; and two turbo-chargers, one mounted at each end of the manifold and each connected to supply air to the engine, said turbo-chargers having multiple jet turbines, respective jets of which are supplied with exhaust gases from corresponding manifold passages, the passages being so chosen that all the jets of each turbine are supplied by the exhaust from a corresponding one of the banks of cylinders.

11. The combination of an internal combustion engine having a plurality of cylinders arranged in line, and having a definite firing order; a manifold comprising a plurality of independent passages symmetrically arranged about a central axis; and substantially identical connections from the various cylinders to respective passages in the manifold, not less than two nor more than three cylinders being connected to the same passage, the passages as a group being helicoidally displaced between cylinder connections in such relation to the firing order that the flows through the several connections leading to a single passage do not materially overlap, and the direction of helicoidal displacement being reversed at least once in the length of the manifold.

12. The combination of an internal combustion engine having at least six cylinders arranged in line and a firing order such that cylinders in alternate halves of the row of cylinders fire successively; a manifold subdivided into a plurality of passages, each passage being connected to at least two and not more than three cylinders whose exhaust periods do not materially overlap; said manifold having alternating straight and helically displaced passage dividing means so arranged that the cylinder connections to the manifold passages are alined and substantially identical.

13. The combination of a multiple cylinder internal combustion engine having cylinders in line; and an exhaust manifold subdivided into distinct exhaust passages which have successive straight and helicoid portions, at least two cylinders being connected to a single passage, the cylinders so connected being chosen so that their exhaust periods do not substantially overlap; and connections from the cylinders to the manifold passages, said connections being similar in form and in location on the cylinders.

EDWARD C. MAGDEBURGER.

REFERENCES CITED

The following references are of record in the file of this patent:

UNITED STATES PATENTS

| Number | Name | Date |
|---|---|---|
| 1,323,685 | Fedden et al. | Dec. 2, 1919 |
| 1,714,948 | Coffin | May 28, 1929 |
| 1,895,538 | Büchi | Jan. 31, 1933 |
| 1,938,737 | Büchi | Dec. 12, 1933 |
| 2,125,703 | Williams | Aug. 2, 1938 |

FOREIGN PATENTS

| Number | Country | Date |
|---|---|---|
| 375,668 | Great Britain | June 30, 1932 |
| 784,514 | France | Apr. 29, 1935 |
| 786,879 | France | June 24, 1935 |
| 138,682 | Switzerland | May 16, 1930 |